United States Patent
Lee et al.

(10) Patent No.: US 7,591,638 B2
(45) Date of Patent: Sep. 22, 2009

(54) STRUCTURE FOR FIXING MOTOR STATOR OF RECIPROCATING COMPRESSOR

(75) Inventors: Hyuk Lee, Siheung (KR); Sang-Sub Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 768 days.

(21) Appl. No.: 11/087,607

(22) Filed: Mar. 24, 2005

(65) Prior Publication Data

US 2005/0214140 A1 Sep. 29, 2005

(30) Foreign Application Priority Data

Mar. 25, 2004 (KR) ...................... 10-2004-0020503

(51) Int. Cl.
F04B 17/04 (2006.01)
F04B 35/04 (2006.01)

(52) U.S. Cl. ........................ 417/415; 417/416; 417/417

(58) Field of Classification Search ................. 417/415, 417/416, 417

See application file for complete search history.

(56) References Cited

U.S. PATENT DOCUMENTS

| 4,028,568 | A | 6/1977 | Tatsumi et al. |
| 6,729,861 | B2 | 5/2004 | Oh et al. |
| 6,838,789 | B2 | 1/2005 | Kwon et al. |
| 6,881,042 | B2 * | 4/2005 | Heo et al. ................... 417/417 |
| 2003/0080634 | A1 | 5/2003 | Kwon et al. |
| 2003/0147759 | A1 | 8/2003 | Chang |
| 2004/0113509 | A1 | 6/2004 | Lilie |
| 2004/0239192 | A1 | 12/2004 | Lilie |

FOREIGN PATENT DOCUMENTS

| CN | 1414689 | 4/2003 |
| CN | 1421609 | 6/2003 |
| WO | 02 093714 | 11/2002 |
| WO | 02 095906 | 11/2002 |

OTHER PUBLICATIONS

U.S. Appl. No. 10/985,936 to Shin et al., filed Nov. 12, 2004.
English language Abstract of CN 1421609.
English language Abstract of CN 1414689.

* cited by examiner

*Primary Examiner*—Charles G Freay
*Assistant Examiner*—Patrick Hamo
(74) *Attorney, Agent, or Firm*—KED & Associates, LLP

(57) ABSTRACT

Disclosed is a structure for fixing a motor stator of a reciprocating compressor, the reciprocating compressor comprising: a frame unit mounted in a casing and elastically supported; a reciprocating motor including an outer stator coupled to the frame unit, an inner stator inserted into the outer stator, and a mover inserted between the outer stator and the inner stator; and a compression unit for compressing a refrigerant by receiving a linear-reciprocation driving force of the reciprocating motor, wherein the inner stator and the frame unit contacting the inner stator are coupled to each other by welding. According to this, the structure is simplified and a fabrication cost is reduced by facilitating a fabrication.

18 Claims, 7 Drawing Sheets

STRUCTURE FOR FIXING MOTOR STATOR OF RECIPROCATING COMPRESSOR

BACKGROUND OF THE INVENTION

1. Field of the Invention

The present invention relates to a reciprocating compressor, and more particularly, to a structure for fixing a motor stator of a reciprocating compressor capable of simplifying a structure for supporting a motor stator and capable of reducing a fabrication cost by facilitating a fabrication.

2. Description of the Conventional Art

Generally, a reciprocating compressor is an apparatus for compressing a refrigerant as a piston is linearly-reciprocated in a cylinder. The reciprocating compressor is largely divided into two types according to a driving mechanism. One is a type that a rotary motion of a motor is converted into a linear-reciprocation to be transmitted to a piston, and the other is a type that a linear-reciprocation of a motor is directly transmitted to a piston.

FIG. 1 is a sectional view showing one example of a reciprocating compressor in accordance with the conventional art.

As shown, the reciprocating compressor comprises: a casing 100 containing lubricating oil of a certain amount at a bottom thereof; a frame unit 200 elastically supported in the casing 100; a reciprocating motor 300 mounted at the frame unit 200 and generating a linear-reciprocation driving force in an up-down direction; a compression unit 400 for compressing gas by receiving a driving force of the reciprocating motor 300; a resonance spring unit 500 for inducing a resonant motion by elastically supporting a motion of the reciprocating motor 300; and a supporting spring unit mounted between the casing 100 and the frame unit 200 to be respectively positioned at upper and lower portions of the casing 100, for elastically supporting a vibration assembly including the frame unit 200 at upper and lower sides.

The frame unit 200 includes: a first frame 210 for supporting the compression unit 400; a second frame 220 coupled to the first frame 210 and supporting one side of the reciprocating motor 300; and a third frame 230 coupled to the second frame 220 and supporting another side of the reciprocating motor 300. The first frame 210 is located at a position lower than the second frame 220 and the third frame 230.

The reciprocating motor 300 is provided with a winding coil C therein, and includes: an outer stator 310 fixedly coupled between the second frame 220 and the third frame 230; an inner stator 320 inserted into the outer stator 310 with a certain air gap and fixed to the third frame 230; and a mover 330 inserted into the air gap between the outer stator 310 and the inner stator 320 and connected to the compression unit 400.

The compression unit 400 includes: a cylinder 410 fixed to the first frame 210; a piston 420 slidably inserted into the cylinder 410 and coupled to the mover 330 of the reciprocating motor 300; a suction valve 430 mounted at an end surface of the piston 420, for opening and closing a suction channel F; a discharge valve 440 mounted at a discharge side of the cylinder 410, for opening and closing the cylinder 410; a valve spring 450 for elastically supporting the discharge valve 440; and a discharge cover 460 having the discharge valve 440 and the valve spring 450 therein, for covering the discharge side of the cylinder 410.

The resonance spring unit 500 includes: a spring supporting plate 510 coupled to a connection part between the mover 330 and the piston 420; and a first resonance spring 520 and a second resonance spring 530 respectively positioned at an upper side and a lower sides of the spring supporting plate 510, for elastically supporting the mover 330 and the piston 420.

The supporting spring unit includes: a lower supporting spring 610 fixed between a bottom surface of the casing 100 and a corresponding lower surface of the discharge cover 460; and an upper supporting spring 620 fixed between an upper surface of the casing 100 and a corresponding upper surface of the third frame 230.

An unexplained reference numeral 110 denotes a suction pipe, 120 denotes a discharge pipe, 331 denotes a magnet, and 332 denotes a magnet hole.

An operation of the reciprocating compressor will be explained as follows.

When power is supplied to the reciprocating motor 300, a flux formed between the outer stator 310 and the inner stator 320 interacts with a flux formed by a magnet M provided at the mover 330 and thereby the mover 330 is linearly-reciprocated. As the mover 330 is linearly-reciprocated, the piston 420 connected to the mover 330 is linearly-reciprocated up and down in the cylinder 410. As the piston 420 is linearly-reciprocated in the cylinder 410, a pressure difference is generated at a compression space P of the cylinder. By the pressure difference, a refrigerant is sucked, compressed, and discharged at the time of a preset pressure, and the series of processes are repeated. At this time, the resonance spring unit 500 induce a resonant motion of the mover 330 and the piston 420.

The reciprocating compressor constitutes a refrigerating cycle system with a condenser, an expansion valve, and an evaporator. The refrigerating cycle system is mounted in a refrigerator, an air conditioner, a showcase, etc.

In order to enhance a price competitiveness, a fabrication cost of the reciprocating compressor has to be lowered by simplifying a structure of the reciprocating compressor. Also, an assembly productivity of the reciprocating compressor has to be enhanced by simplifying fabrication processes. A construction of a reciprocating motor and a structure for fixing the reciprocating motor are very complicated thus to be required to be improved.

FIGS. 2 and 3 are respectively a sectional view and a disassembled perspective view of a structure for fixing a motor stator of a reciprocating compressor in accordance with the conventional art.

As shown, the inner stator 320 of the reciprocating motor includes: a stacked body 321 formed as a plurality of thin plates having a certain shape are stacked as a cylindrical shape; and fixing rings 322 coupled to both sides of the stacked body 321 and fixing the stacked body 321. The thin plates are arranged towards a center of the stacked body 321.

The third frame 230 includes: a cylindrical fixing portion 231 having a certain thickness and length; a stepped cylindrical portion 233 extendingly formed with a certain length at one side of the cylindrical fixing portion 231 to form a stepped surface 232; and a flange portion 234 curvedly formed at the stepped cylindrical portion 233. The cylindrical fixing portion 231 is formed to be longer than the stacked body 321 of the inner stator.

As the cylindrical fixing portion 231 of the third frame is penetratingly inserted into the stacked body 321 of the inner stator, the third frame 230 and the inner stator 320 are coupled to each other.

A fixing plate 340 having a disc shape is fixedly coupled to the end of the cylindrical fixing portion 231 of the third frame inserted into the stacked body 321 of the inner stator. The fixing plate 340 is fixedly coupled to the cylindrical fixing portion 231 by welding under a state that the fixing plate 340 is inserted into the cylindrical fixing portion 231.

One side surface of the inner stator 320 is supported at the stepped surface 232 of the third frame and another side surface of the inner stator 320 is supported at the fixing plate 340, thereby fixedly coupling the inner stator 320 to the third frame 230.

One side of the upper supporting spring 620 is fixedly supported at the flange portion of the third frame 234. Also, a certain gap is maintained between an outer circumferential surface of the inner stator 320 and an inner circumferential surface of the outer stator 310 so that the mover 330 can be inserted therebetween.

However, in the conventional structure, since the cylindrical fixing portion 231 of the third frame has to be penetratingly inserted into the inner stator 320, the entire outer circumferential surface of the cylindrical fixing portion 231 has to be precisely processed. However, the processing is difficult and the processing cost is high. If a tolerance between the third frame 230 and the inner stator 320 is generated as the inner stator 320 and the third frame 230 are not precisely processed, an air gap between the inner stator 320 and the outer stator 310 is not constantly maintained. According to this, a contact between the inner stator 320 and the mover 330 or a contact between the outer stator 310 and the mover 330 is caused, and a motor efficiency is lowered.

Also, since the cylindrical fixing portion 231 of the third frame is penetratingly inserted into the inner stator 320 and the fixing plate 340 coupled to the cylindrical fixing portion 231 fixes the inner stator 320, the size of the third frame 230 becomes relatively large. According to this, it is difficult to process the third frame 230. Also, since the third frame 230 requires much material and the additional fixing plate 340 is used, a fabrication cost is increased at the time of a massive production.

SUMMARY OF THE INVENTION

Therefore, an object of the present invention is to provide a structure for fixing a motor stator of a reciprocating compressor capable of simplifying a structure for supporting a motor stator and capable of reducing a fabrication cost by facilitating a fabrication.

To achieve these and other advantages and in accordance with the purpose of the present invention, as embodied and broadly described herein, there is provided a structure for fixing a motor stator of a reciprocating compressor, the reciprocating compressor comprising: a frame unit mounted in a casing to be elastically supported; a reciprocating motor including an outer stator coupled to the frame unit, an inner stator inserted into the outer stator, and a mover inserted between the outer stator and the inner stator; and a compression unit for compressing a refrigerant by receiving a linear-reciprocation driving force of the reciprocating motor, wherein the inner stator and the frame unit contacting the inner stator are coupled to each other by welding.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a structure for fixing a motor stator of a reciprocating compressor according to the present invention will be explained in more detail with reference to the attached drawings.

Figure 1:
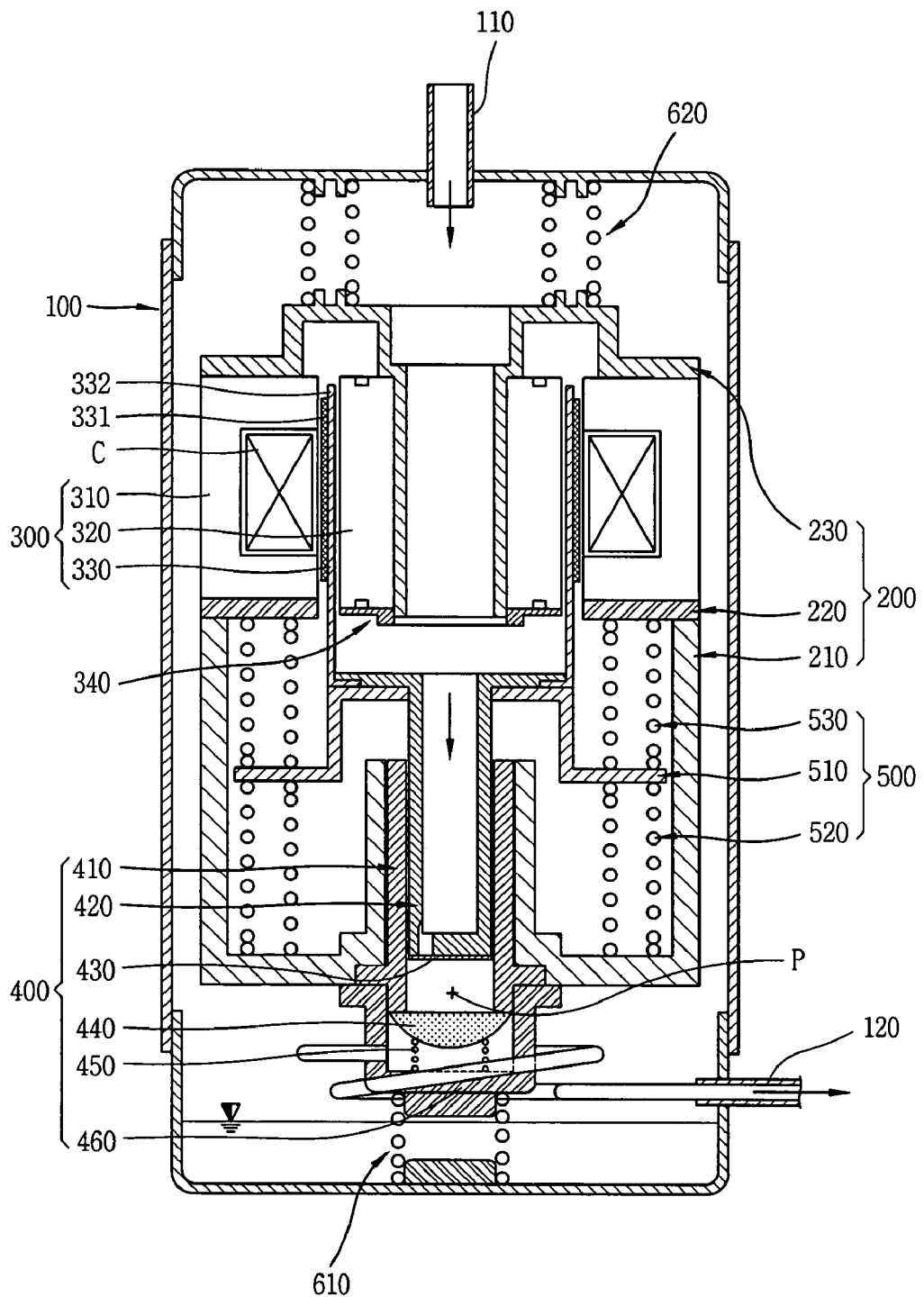
FIG. 1 is a sectional view sowing a reciprocating compressor in accordance with the conventional art.
Figure 2:
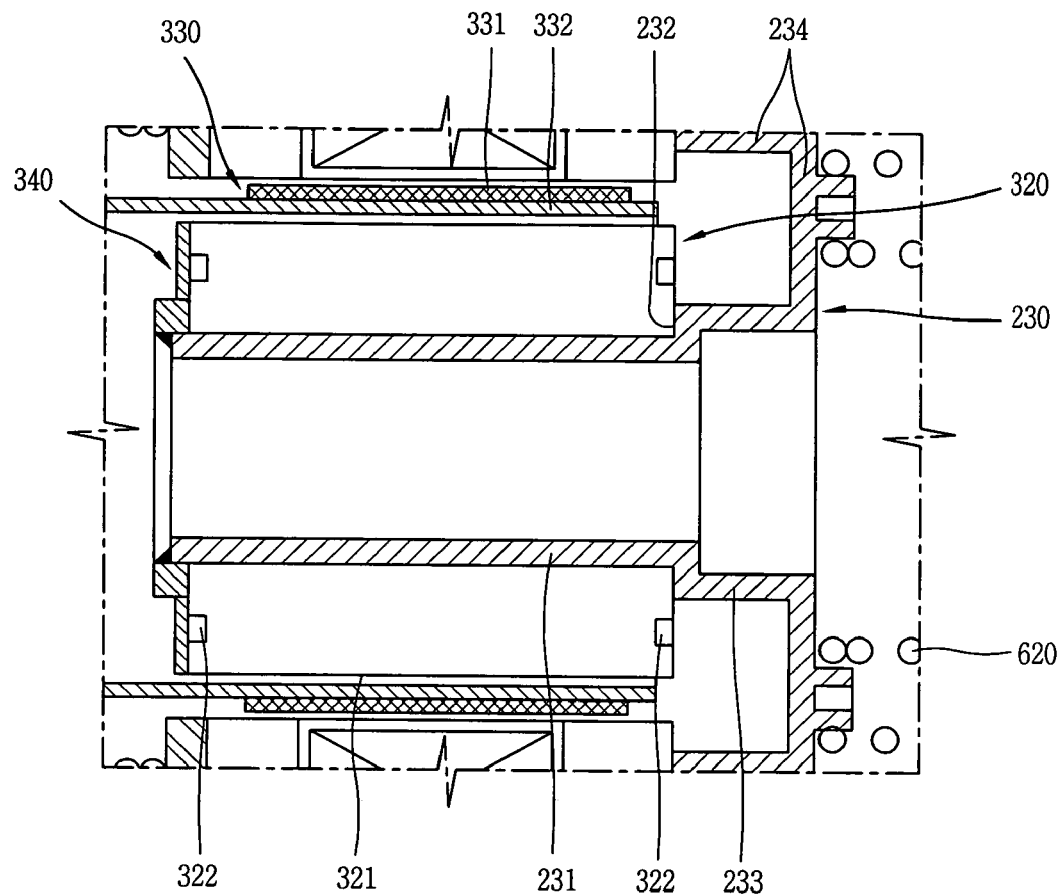
FIGS. 2 and 3 are respectively a sectional view and a disassembled perspective view showing a structure for fixing a motor stator of the reciprocating compressor in accordance with the conventional art.
Figure 3:
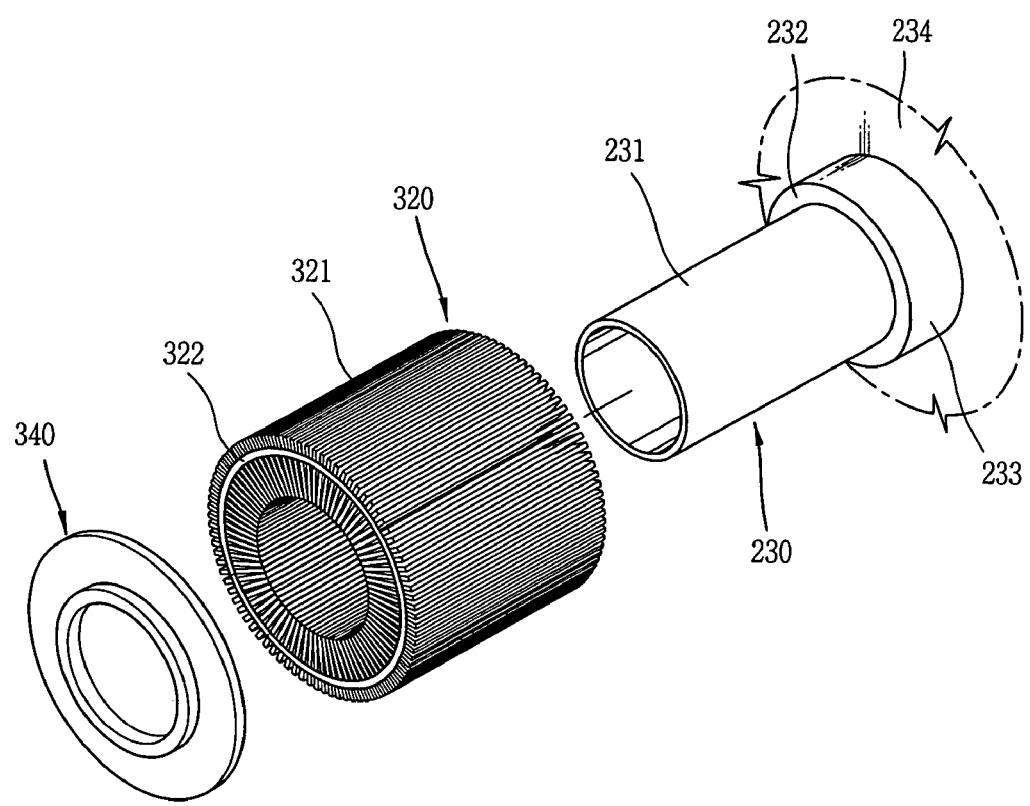
Figure 4:
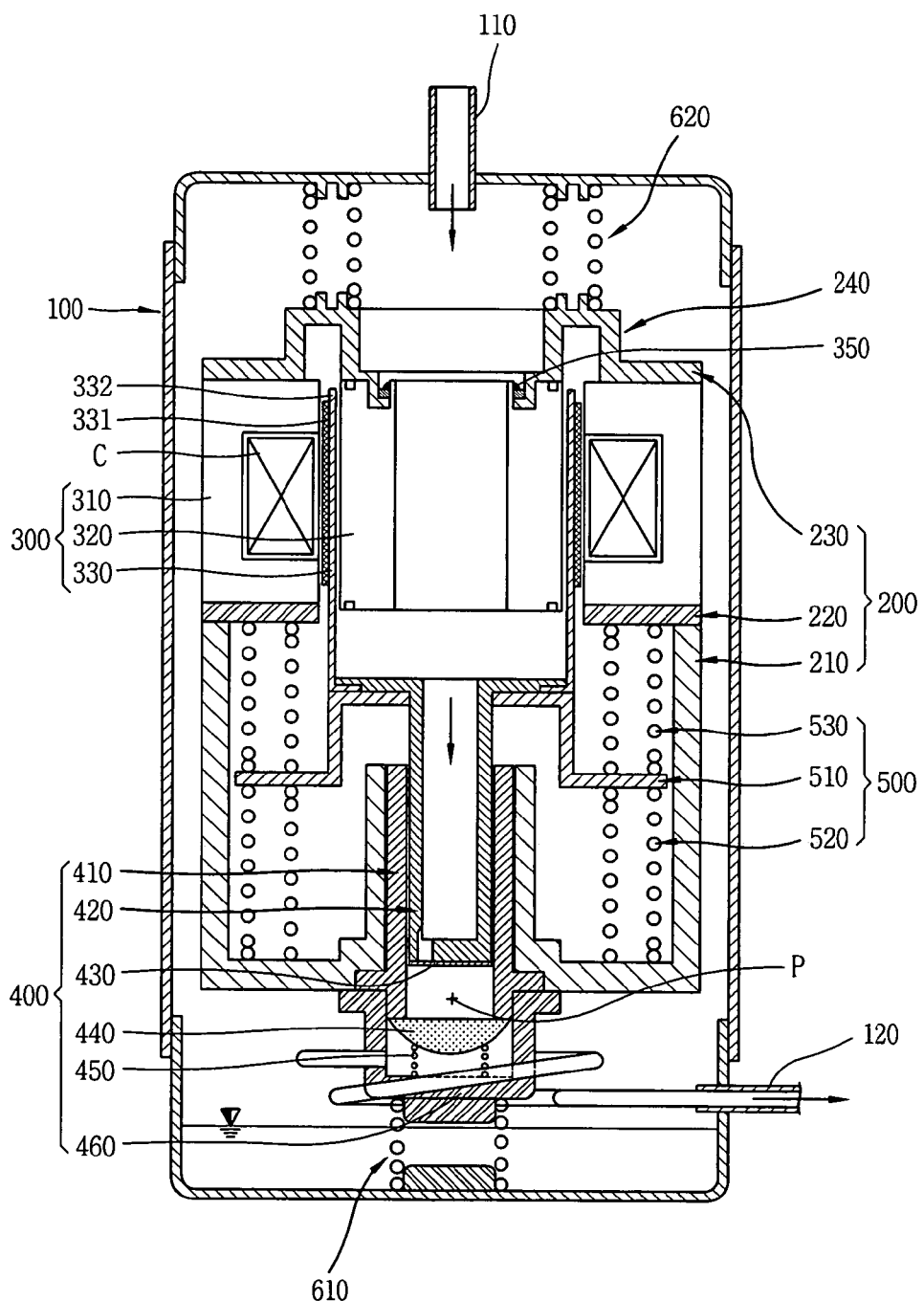
FIG. 4 is a sectional view showing a reciprocating compressor having a structure for fixing a motor stator of a reciprocating compressor according to a first embodiment of the present invention.
Figure 5:
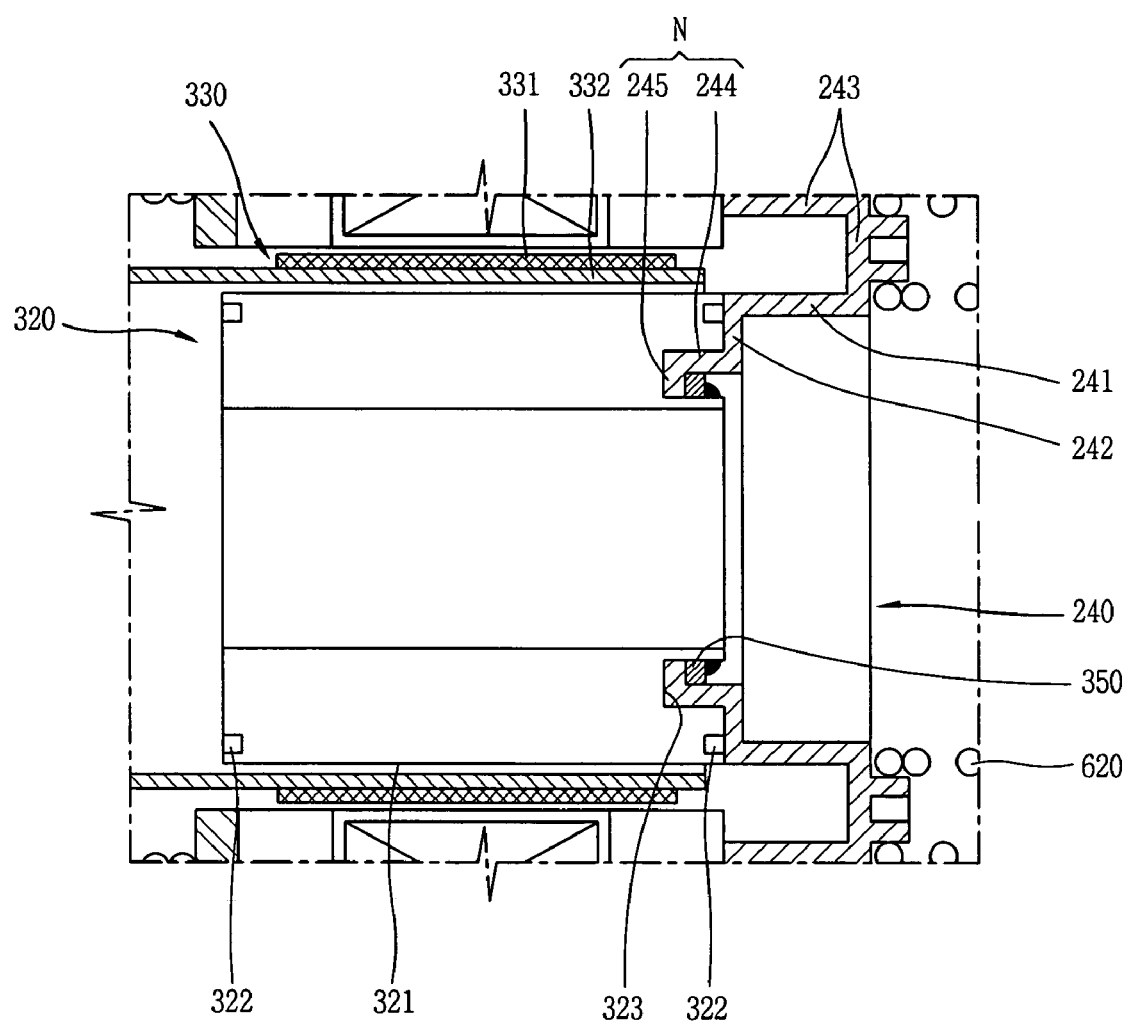
FIGS. 5 and 6 are respectively a sectional view and a disassembled perspective view showing a structure for fixing a motor stator of a reciprocating compressor according to one embodiment of the present invention.
Figure 6:
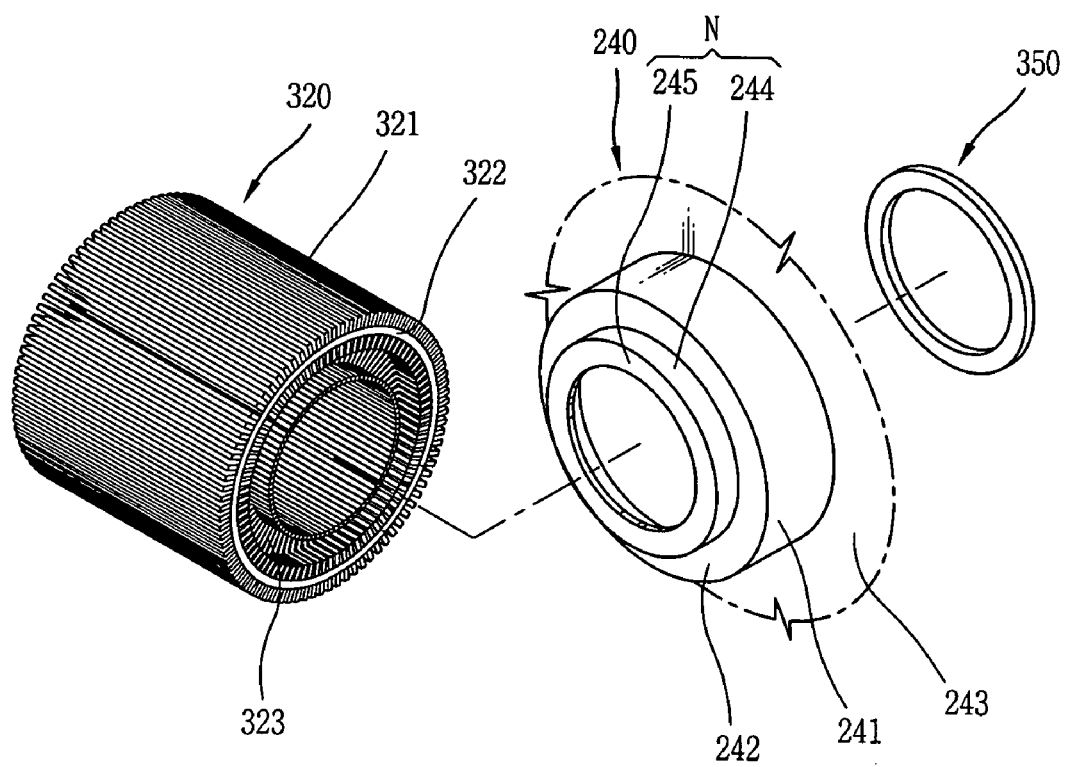

FIG. 4 is a sectional view showing a reciprocating compressor having a structure for fixing a motor stator of a reciprocating compressor according to a first embodiment of the present invention; and FIGS. 5 and 6 are respectively a sectional view and a disassembled perspective view showing a structure for fixing a motor stator of a reciprocating compressor according to one embodiment of the present invention.

As shown, a reciprocating compressor having a structure for fixing a motor stator of a reciprocating compressor according to a first embodiment of the present invention comprises: a casing 100 containing lubricating oil of a certain amount at a bottom thereof; a frame unit 200 elastically supported in the casing 100; a reciprocating motor 300 mounted at the frame unit 200 and generating a linear-reciprocation driving force in an up-down direction; a compression unit 400 for compressing gas by receiving a driving force of the reciprocating motor 300; a resonance spring unit 500 for inducing a resonant motion by elastically supporting a motion of the reciprocating motor 300; and a supporting spring unit mounted between the casing 100 and the frame unit 200 to be respectively positioned at upper and lower portions of the casing 100, for elastically supporting a vibration assembly including the frame unit 200 at upper and lower sides.

The frame unit 200 includes: a first frame 210 for supporting the compression unit 400; a second frame 220 coupled to the first frame 210 and supporting one side of the reciprocating motor 300; and a fourth frame 240 coupled to the second frame 220 and supporting another side of the reciprocating motor 300. The first frame 210 is located at a position lower than the second frame 220 and the fourth frame 240.

The reciprocating motor 300 is provided with a winding coil C therein, and includes: an outer stator 310 fixedly coupled between the second frame 220 and the fourth frame 240; an inner stator 320 inserted into the outer stator 310 with a certain air gap and fixedly coupled to the fourth frame 240;

and a mover 330 inserted into the air gap between the outer stator 310 and the inner stator 320 and connected to the compression unit 400.

The inner stator 320 and the fourth frame 240 are coupled to each other by welding.

The inner stator 320 includes: a stacked body 321 formed as a plurality of thin plates having a certain shape are laminated to form a cylindrical shape; and fixing rings 322 coupled to both side surfaces of the stacked body 321. The thin plates are arranged towards the center of the stacked body 321, and a welding groove 323 is provided at one side surface of the stacked body 321. The welding groove 323 is formed as a ring shape having a certain width and depth along a lateral shape of the stacked body 321. The side surface of the stacked body 321 where the welding groove 323 is formed is a surface contacting the fourth frame 240.

The inner stator 320 can be formed as a cylindrical body having a certain length and outer diameter. The welding groove is formed at a side surface of the cylindrical body.

The fourth frame 240 includes: a cylindrical portion 241 having a certain length; a contact supporting portion 242 curvedly extended from one side of the cylindrical portion 241 and contacting a side surface of the inner stator 320; an extension protrusion N extendingly formed from the contact supporting portion 242 and inserted into the welding groove 323 of the inner stator 320; and a flange portion 243 curvedly extended from another side of the cylindrical portion 241 and supporting one side surface of the outer stator 310.

The extension protrusion N is composed of: an extension portion 244 curvedly extended from the contact supporting portion 242; and a curved portion 245 curvedly formed at the extension portion 244. The extension portion 244 is formed as a ring shape and is perpendicular to the contact supporting portion 242. A length of the extension portion 244 is equal to a depth of the welding groove 323. The curved portion 245 is formed to be perpendicular to the extension portion 244, and a length of the curved portion 245 corresponds to a width of the welding groove 323.

The fourth frame 240 is preferably formed of aluminum having an excellent molding characteristic and preventing a flux flow.

The fourth frame 240 is coupled to the inner stator 320 as the extension protrusion N thereof is inserted into the welding groove 323 of the inner stator. Under the state, the contact supporting portion 242 is in contact with a side surface of the inner stator 320, and the flange portion 243 supports a side surface of the outer stator 310.

A welding member 350 having a certain shape is inserted into the welding groove 323. The welding member 350 is formed as a circular ring shape having a sectional surface of a square shape. The welding member 350 is preferably formed of the same material as the inner stator 320.

The welding member 350 is inserted into the welding groove 323 thereby to support the extension protrusion N of the fourth frame 240.

As an inner wall of the welding groove 323 of the inner stator is coupled to the welding member 350 by welding, the inner stator 320 and the fourth frame 240 are fixedly coupled to each other. A welding portion by welding is formed between the inner wall of the welding groove 323 and the welding member 350.

One side of the upper supporting spring 620 is fixed to one side of the fourth frame 240.

Figure 7:
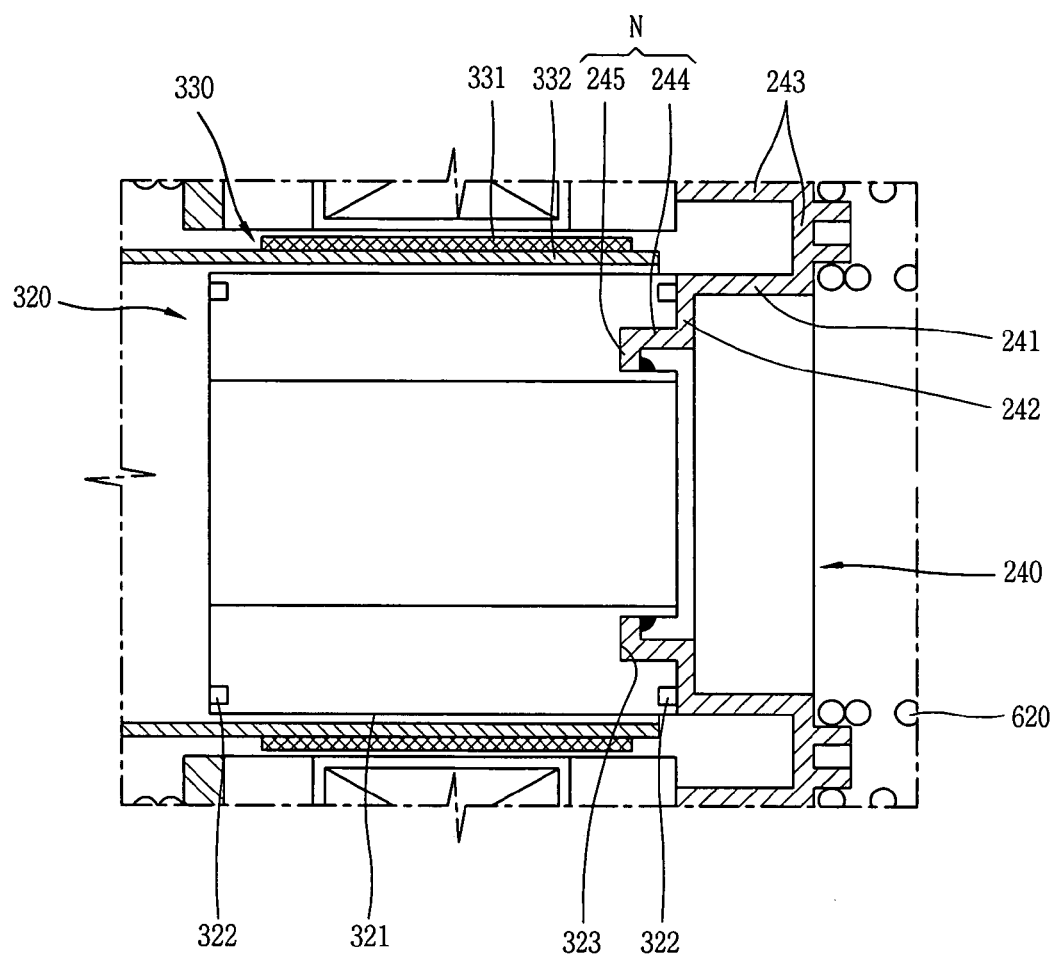
FIG. 7 is a sectional view showing a structure for fixing a motor stator of a reciprocating compressor according to another embodiment of the present invention.

As another embodiment of the structure for fixing a motor stator of a reciprocating compressor according to the present invention, as shown in FIG. 7, the welding groove 323 having a certain shape is formed at a side surface of the inner stator 320, and the extension protrusion N extendingly protruded as a certain shape is formed at the fourth frame 240 contacting the side surface of the inner stator 320. The extension protrusion N is inserted into the welding groove 323, and the extension protrusion N is fixedly coupled to the inner wall of the welding groove 323 by welding, thereby coupling the inner stator 320 and the fourth frame 240 to each other. According to the above structure, under a state that the extension protrusion N of the fourth frame 240 is inserted into the welding groove 323 of the inner stator, the inner wall of the welding groove 323 and the extension protrusion N are welded to each other without inserting the additional welding member 350. In case that the extension protrusion N of the fourth frame is not properly welded, the extension protrusion N is fixed by the welding portion welded at the inner wall of the welding groove 323.

Hereinafter, operation effects of the structure for fixing a motor stator of a reciprocating compressor according to the present invention will be explained as follows.

The extension protrusion N of the fourth frame is inserted into the welding groove 323 formed at a side surface of the inner stator 320 of the reciprocating motor, the welding member 350 is inserted into the welding groove 323, and the welding member 350 and the inner wall of the welding groove 323 are welded to each other, thereby facilitating to couple the inner stator 320 to the fourth frame 240.

Also, since the extension protrusion N is provided at the fourth frame and is inserted into the welding groove 323 of the inner stator 320, the size of the fourth frame 240 can be greatly reduced. That is, in the conventional art, since the cylindrical fixing portion 231 penetrating the inner stator 320 is provided at the third frame 230 coupled to the inner stator 320, the size of the third frame 230 is relatively large. However, since the fourth frame 240 is provided with only the extension protrusion N inserted into the welding groove 323, the size of the fourth frame 240 is relatively small. As the extension protrusion N of the fourth frame 240 becomes relatively short, a processing is facilitated, processing time is shortened, and the fourth frame 240 can be easily fabricated by a molding method or a pressing method.

In the present invention, the conventional fixing plate 340 is not used thereby to reduce a material amount. Also, in the present invention, the welding member 350 formed as a ring shape and inserted into the welding groove 323 has a small size and a simple structure.

As aforementioned, in the structure for fixing a motor stator of a reciprocating compressor according to the present invention, the fourth frame 240 coupled to the inner stator 320 of the reciprocating motor is easily processed and the processing time is short, thereby reducing a fabrication cost and increasing a productivity.

Also, the size of the fourth frame is relatively small and the conventional fixing plate is not used, thereby greatly reducing a material amount at the time of a massive production and thus reducing a production cost.

Additionally, since the fourth frame can be easily fabricated by a molding method or a pressing method, the fourth frame can be variously processed and the fabrication cost can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The present disclosure relates to subject matter contained in Korean Application No. 10-2004-20503, filed on Mar. 25, 2004, the contents of which are herein expressly incorporated by reference in its entirety.

What is claimed is:

1. A structure for fixing a motor stator of a reciprocating compressor, the reciprocating compressor comprising:
a frame unit elastically supported in a casing, the frame unit comprising a plurality of frames assembled to each other;
a reciprocating motor including a cylindrical outer stator having upper and lower side surfaces fixedly coupled to the frame unit, a cylindrical inner stator inserted into the outer stator, and a mover inserted between the outer stator and the inner stator and performing a reciprocation; and
a compression unit disposed at an outer periphery of the reciprocating motor, and mechanically connected to the mover of the reciprocating motor, wherein the compression unit compresses a refrigerant in response to a linear-reciprocation driving force received from the reciprocating motor, wherein an upper side surface of the inner stator is coupled to one frame coupled to an upper side surface of the outer stator, and wherein an inner circumferential surface and a lower side surface of the inner stator are freely disposed with respect to the one frame coupled to the upper side surface of the inner stator, wherein a welding groove having a ring shape is formed at an upper side surface of the inner stator, and an extension protrusion having a ring shape protrudes from a frame of the frame unit contacting an upper side surface of the inner stator, wherein the extension protrusion is inserted into the welding groove so as to support the inner stator, and the inner stator and the frame contacting the inner stator are fixedly coupled by welding.

2. The structure of claim 1, wherein a welding member having a certain shape is inserted into the welding groove on an upper side surface of the extension protrusion, and the welding member is fixedly coupled to an inner wall of the welding groove by welding, thereby fixedly coupling the inner stator to the frame.

3. The structure of claim 2, wherein the welding groove is formed as a ring shape having a certain width and depth along the upper side surface of the inner stator.

4. The structure of claim 3, wherein the extension protrusion comprises:
an extension portion extended from the frame unit as much as a depth of the welding groove, an outer circumferential surface of the extension contacts an outer wall surface of the welding groove, and an edge surface of the extension contacts to an bottom surface of the welding groove; and
a curved portion extended from the extension portion, an edge surface of the curved portion contacts to the inner wall surface of the welding groove.

5. The structure of claim 2, wherein the welding member is formed as a ring shape.

6. The structure of claim 2, wherein the welding member is formed of the same material as the inner stator.

7. The structure of claim 1, wherein the inner stator includes:
a stacked body formed as a plurality of thin plates having a certain shape which are stacked; and
fixing rings coupled to both sides of the stacked body.

8. The structure of claim 1, wherein a welding protrusion is fixedly coupled to an inner wall of the welding groove by welding, the extension protrusion is supported to the welding protrusion in direction of shaft, thereby fixedly coupling the inner stator to the frame unit.

9. A structure for fixing a motor stator of a reciprocating compressor, the reciprocating compressor comprising:
a frame unit mounted in a casing to be elastically supported, and formed as a plurality of frames are assembled to each other;
a reciprocating motor including a cylindrical outer stator having upper and lower side surfaces fixedly-coupled to the frame unit, a cylindrical inner stator inserted into the outer stator, and a mover inserted between the outer stator and the inner stator and performing a reciprocation; and
a compression unit disposed at an outer periphery of the reciprocating motor, and mechanically connected to the mover of the reciprocating motor, for compressing a refrigerant by receiving a linear-reciprocation driving force of the reciprocating motor,
wherein a ring-shaped welding groove is formed on an upper side surface of the inner stator,
wherein a ring-shaped extension protrusion inserted into the welding groove and supporting the inner stator protrudes from the frame contacting an upper side surface of the inner stator, and
wherein a welding member couples the inner stator and the frame unit with each other by being welded to a wall surface of the welding groove.

10. The structure of claim 9, wherein the welding groove is formed as a ring shape having a certain width and depth along the upper side surface of the inner stator.

11. The structure of claim 10, wherein the extension protrusion comprises:
an extension portion extended from the frame unit as much as a depth of the welding groove, an outer circumferential surface of the extension contacts to an outer wall surface of the welding groove, and an edge surface of the extension contacts a bottom surface of the welding groove; and
a curved portion extended from the extension portion, an edge surface of the curved portion contacts the inner wall surface of the welding groove.

12. The structure of claim 9, wherein the welding member is formed of the same material as the inner stator.

13. A structure for fixing a motor stator of a reciprocating compressor, the reciprocating compressor comprising:
a frame unit mounted in a casing to be elastically supported, and formed as a plurality of frames are assembled to each other;
a reciprocating motor including a cylindrical outer stator having upper and lower side surfaces fixedly-coupled to the frame unit, a cylindrical inner stator inserted into the outer stator, and a mover inserted between the outer stator and the inner stator and performing a reciprocation; and
a compression unit disposed at an outer periphery of the reciprocating motor, and mechanically connected to the mover of the reciprocating motor, for compressing a refrigerant by receiving a linear-reciprocation driving force of the reciprocating motor,
wherein a ring-shaped welding groove is formed on an upper side surface of the inner stator, wherein a ring-shaped extension protrusion inserted into the welding groove and supporting the inner stator protrudes from the frame contacting an upper side surface of the inner stator, wherein a welding portion is protrudingly formed by welding on a wall surface of the welding groove facing an upper side surface of the extension protrusion, and wherein the inner stator is coupled to the frame unit as the extension protrusion is supported by the welding portion in a shaft direction.

14. The structure of claim 13, wherein the welding groove is formed as a ring shape having a certain width and depth along the upper side surface of the inner stator.

15. The structure of claim 14, wherein the extension protrusion comprises:

an extension portion extended from the frame unit as much as a depth of the welding groove, an outer circumferential surface of the extension contacts to an outer wall surface of the welding groove, and an edge surface of the extension contacts a bottom surface of the welding groove; and a curved portion extended from the extension portion, an edge surface of the curved portion contacts to the inner wall surface of the welding groove.

16. The structure of claim 13, wherein the welding member is formed of the same material as the inner stator.

17. The structure of claim 13, wherein an upper side surface of the inner stator is coupled to one frame coupled to an upper side surface of the outer stator, and wherein an inner circumferential surface and a lower side surface of the inner stator are freely disposed with respect to the frame coupled to an upper side surface of the inner stator.

18. The structure of claim 13, wherein the inner stator includes:

a stacked body formed as a plurality of thin plates having a certain shape are stacked; and fixing rings coupled to both sides of the stacked body.

* * * * *